United States Patent
Nakayama

(10) Patent No.: US 6,413,630 B1
(45) Date of Patent: Jul. 2, 2002

(54) DECORATIVE FILM

(75) Inventor: Akihiko Nakayama, Gotemba (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/423,260

(22) PCT Filed: May 14, 1998

(86) PCT No.: PCT/US98/09815

§ 371 (c)(1),
(2), (4) Date: Nov. 4, 1999

(87) PCT Pub. No.: WO98/51516

PCT Pub. Date: Nov. 19, 1998

(30) Foreign Application Priority Data

May 15, 1997 (JP) ............................................. 9-125742

(51) Int. Cl.[7] ............................ C08J 7/04; B29C 39/00; B32B 27/00; A47J 37/08

(52) U.S. Cl. .................... 428/344; 428/411.1; 428/421; 428/432; 264/298; 264/299; 264/300; 264/319; 264/328.1; 264/331.11; 264/331.14; 427/248.1; 427/490; 427/497; 427/498; 219/386; 219/495; 219/518; 219/519; 99/339 P

(58) Field of Search .............................. 428/411.1, 421, 428/344, 432; 427/248.1, 490, 497–498; 264/239, 241, 298, 299, 300, 319, 328.1, 331.11, 331.14

(56) References Cited

U.S. PATENT DOCUMENTS

| | | |
|---|---|---|
| 4,068,034 A | 1/1978 | Segawa et al. |
| 5,045,143 A | 9/1991 | Arcella et al. |
| 5,164,245 A | 11/1992 | Suzuki |
| 5,208,305 A | 5/1993 | Grootaert |
| 5,378,782 A | 1/1995 | Grootaert |
| 5,411,688 A | 5/1995 | Morrison et al. |
| 5,576,381 A | 11/1996 | Bladel et al. |
| RE35,466 E | 2/1997 | Grootaert |
| 5,658,670 A | 8/1997 | Fukushi et al. |

FOREIGN PATENT DOCUMENTS

| | | |
|---|---|---|
| GB | 2 010 169 | 6/1979 |
| JP | 60-71249 | 4/1985 |
| JP | 1-174584 | 7/1989 |
| JP | 2-64187 | 3/1990 |
| JP | 4-35938 | 2/1992 |

OTHER PUBLICATIONS

* * English Language Abstract.

Primary Examiner—P. Hampton-Hightower
(74) Attorney, Agent, or Firm—Harold C. Knecht III

(57) ABSTRACT

A decorative film having an excellent decorative effect, excellent three-dimensional curvature emulating properties, three-dimensional curvature formability, long-term weather resistance and stain resistance. The decorative film comprises one or more transparent layers and a decorative metal layer. The transparent layer has an adhered side for being adhered to a substrate. The transparent layer comprises a copolymer of a tetrafluoroethylene, a hexafluoropropylene and a vinylidene fluoride. The decorative metal layer is on the adhered side of the transparent layer. A substrate can be bonded to the metal layer of the decorative film. The substrate can be a complex three-dimensional shaped substrate. The substrate can also be an injection molded substrate. An adhesive can be disposed on the metal layer of the decorative film, and the adhesive layer can be disposed between the metal layer and the substrate.

18 Claims, No Drawings

DECORATIVE FILM

FIELD OF THE INVENTION

The present invention relates to a decorative film, in particular, a decorative film having a decorative metal layer on the surface of the adhered side of a transparent layer, more particularly, a decorative film which can be used for decoration as a label, sticker, stripe tape, etc., or which can alternatively be used for insert molding. The decorative film of the present invention, while naturally exhibiting an excellent decorative effect with a metal luster appearance, can also be attached to a substrate surface having a complex three-dimensional curvature or shape, and particularly insert molded products, without creating defects resulting in a poor appearance, etc. The present decorative film also has excellent long-term weather resistance and stain resistance.

BACKGROUND OF THE INVENTION

A variety of decorative films having a decorative metal layer on the surface of the adhered side of a transparent layer are well-known, and most of the conventional decorative films have a structure with a metal vapor coating film on a transparent layer made of a fluorine-containing resin. For example, Japanese Unexamined Patent Publication (Kokai) No. 60-71249 discloses a process for producing a composite material used as a surface material for automobile side moldings, bumper moldings, window moldings, etc. which comprises a step of laying aluminum, to a thickness of 100–300 Å, on one side of a 12–50 gm-thick transparent fluorine-containing film, by vapor coating. A tetrafluoroethylene-ethylene copolymer resin is used to make this transparent film. Also, Japanese Unexamined Patent Publication (Kokai) No. 1-174584 discloses a metal luster adhesive sheet which can be attached particularly to a substrate with three-dimensional curvature, and which has a metal thin-film layer on at least one side of a fluorine-containing film, with a pressure-sensitive adhesive layer also formed thereon. This fluorine-containing film is polyvinyl fluoride or polyvinylidene fluoride, or a copolymer thereof A similar metal luster adhesive sheet is disclosed in Japanese Unexamined Patent Publication (Kokai) No. 2-64187. The metal luster adhesive sheet described in this publication has a metal thin-film layer on one side of a fluorine-containing film substrate and on the other side a plasma treated layer with a fluorine content of less than 65% with respect to the substrate and an oxygen content of one or more atoms to 20 atoms of carbon, with an adhesive layer formed on the surface of the metal thin-film layer.

The applicant has also filed a patent application for the laminate film with a metal-based luster disclosed in Japanese Unexamined Patent Publication (Kokai) No. 4-35938. This laminate film has, in order from the top, a first resin layer whose main component is a mixture of a vinylidene fluoride resin/polymethacrylic acid ester-based resin, a second resin layer whose main component is a mixture of a vinylidene fluoride resin/polymethacrylic acid ester-based resin with a different weight ratio, and a metal layer. The invention described here gives the effect of expressing a beautiful color tone by using a high fluorine content resin with excellent heat resistance as a highly heat-accumulating inner layer (second resin layer), to provide strength for withstanding even temperatures of 120° C., while also using a low fluorine content resin, with excellent adhesion with ink, etc., as the surface layer (first resin layer) to allow freer colorability, as well as layering of an additional transparent colored resin layer thereon.

In the decorative films disclosed in the above-mentioned and other unexamined patent publications, the fluorine-containing resins used are generally polyvinyl fluoride, polyvinylidene fluoride, polytrifluorochloroethylene, polytetrafluoroethylene, tetrafluoroethylene-ethylene copolymer, tetrafluoroethylenehexafluoropropylene copolymer, polyvinylidene fluoride/polymethyl methacrylate mixtures, etc. These fluorine-containing resins are usually used to make monolayer extruded films or, as disclosed for example in Japanese Unexamined Patent Publication (Kokai) No. 4-35938, double-layer coextruded films. The decorative films of the past which employed fluorine-containing transparent films have exhibited satisfactory properties, particularly three-dimensional curvature emulating properties, compared to decorative films using a polyethylene terephthalate (PET) transparent film(s).

However, decorative films with a conventional fluorine containing transparent layer or film(s) still do not exhibit sufficient three-dimensional curvature emulating properties. Furthermore, all of the fluorine-containing transparent layers for decorative films currently on the market, including those disclosed in the examples of the unexamined patent publications cited above, are films formed by melt extrusion molding of the fluorine-containing resins. The production process for this molding technique tends to produce appearance defects such as the well-known "fish-eye" phenomenon, which has become a major cause of reduced product yields. In addition, films produced by melt extrusion molding generally have inferior thickness precision. Thus, these transparent films tend to have non-uniform sections and therefore when coated with a metal layer by vacuum deposition or the like, surface waviness is produced on the transparent film, producing appearance defects such as vapor deposition lines.

SUMMARY OF THE INVENTION

The aforementioned and other problems are overcome, in accordance with the present invention, by providing a decorative film having a desirable decorative effect, a desirable degree of transparency of its transparent layer, three-dimensional curvature emulating properties, three-dimensional curvature formability, and long-term weather resistance and stain resistance.

Compared to the present decorative film, prior decorative films with a conventional fluorine containing transparent layer or film do not exhibit three-dimensional curvature emulating properties sufficient, in particular, for producing insert-molded or in-molded decorative articles with complex three-dimensional surfaces, such as emblems for vehicles including automobiles and motorcycles. That is, an important element during insert-molding is the pre-adhesion of the decorative film to a complex and intricately-shaped inner wall of a mold. In practice, numerous gaps can be produced between the inner wall of the mold and the decorative film as a result of stretching of the film, etc. The formation of these gaps produces defects in the shape of the resulting molded product. Irregular stretching of the film can also cause breakage of the film. In addition, when the film fails to emulate the intricate shape of the mold, it becomes very difficult to obtain a molded product with a shape of the desired design.

As discussed above, the fluorine containing transparent films used in prior decorative films are formed by melt extrusion molding, which tends to result in the undesirable "fish-eye" phenomenon and generally inferior thickness precision. By casting its transparent layer, the present decorative film can avoid these. problems. In addition, there are problems associated with trying to cast the transparent layers used in prior decorative films. For example, when attempting to form a decorative film by casting a transparent support layer of polyvinylidene fluoride, it is highly difficult to prepare a casting solution of the polyvinylidene fluoride. Polyvinylidene fluoride is insoluble in common organic solvents, and is soluble only in certain polar solvents such as such as N-methylpyrrolidone, but even there its solubility is at a very low level (less than 10 wt %, and generally only a few weight-percent). Since only solutions of low solid content can be prepared, only thin films can be formed using the prior art fluorine containing resins, even with the casting process.

Furthermore, because of hazing of the film when polyvinylidene fluoride is used alone, an acrylic resin or the like must also be used for anti-hazing. Otherwise, a highly transparent film cannot be produced. It has been considered to form the transparent film by casting a copolymer resin with a molar ratio of 4:1 for vinylidene fluoride and tetrafluoroethylene. This copolymer resin is soluble up to about 20 wt % in common organic solvents including acetone and ethyl acetate. Thus, it can give thicker films than the aforementioned polyvinylidene fluoride. Nevertheless, this resin also produces hazing of the film when used alone, and therefore, an acrylic resin or the like must be used to produce a highly transparent film.

Accordingly, in one aspect of the present invention, a decorative film is provided which comprises one or more transparent layers and a decorative metal layer. The transparent layer has an adhered side for being adhered to a substrate. The transparent layer comprises a copolymer of a tetrafluoroethylene, a hexafluoropropylene and a vinylidene fluoride. It may be desirable for the transparent layer to consists essentially of this copolymer or to consist only of this copolymer. The decorative metal layer is on the adhered side of the transparent layer. It is desirable for the metal layer to be a metal vapor deposition film. It can be desirable for an adhesive to be disposed on the metal layer.

In another aspect of the present invention, a decorative article is provided which comprises the above decorative film with a substrate bonded to the metal layer. It is desirable for the substrate to be a complex three dimensional shaped substrate. It is also desirable for the substrate to be an injection molded substrate. It can be desirable for an adhesive layer to be disposed between the metal layer and the substrate.

In yet another aspect of the present invention, a method is provided for making a decorative substrate comprising the steps of: casting a transparent layer comprising a copolymer of a tetrafluoroethylene, a hexafluoropropylene and a vinylidene fluoride; applying a decorative metal layer on the adhered side of the transparent layer to form a decorative film; and attaching the metal layer of the decorative film to a substrate so as to form a decorative substrate. It can be desirable for the method to include the step of injection molding the substrate. In particular, it can be desirable for the step of attaching the decorative film to include the step of insert molding the substrate to the decorative film. When the substrate is a complex three dimensional shaped substrate, it is desirable for the decorative film to be attached so as to conform to the shape of the substrate.

In a further aspect of the present invention, a method is provided for producing a decorative film with a decorative metal layer on the surface of the adhered side of a transparent support by comprising the following steps: casting and drying a coating solution of a tetrafluoroethylene, hexafluoropropylene and vinylidene fluoride copolymer on the release-treated surface of a sheet-like liner or carrier to a prescribed thickness and then, after removing the liner if necessary, forming a decorative metal layer on the surface of the formed film-like support.

The present invention is the result of diligent research aimed at finding a fluorine-containing resin with excellent long-term weather resistance and stain resistance. Such a fluorine-containing resin, composed of the specific copolymer described above, has been achieved through selection among fluorine-containing monomers and their polymerization ratios. Surprisingly, a colorless transparent film of uniform thickness and with a satisfactory outer appearance can be made from this fluorine-containing resin by casting alone without mixture with other synthetic resins. In addition, when a transparent film obtained in this manner is used and its surface is covered with a metal layer (e.g., a metal vapor coated layer) to prepare a decorative film, the decorative film has many properties which have been difficult, if not impossible, to achieve with conventional decorative films. These properties include an excellent three-dimensional curvature emulating property and metal luster appearance. In particular, because of its excellent three-dimensional curvature emulating property and three-dimensional curvature formability, the present decorative film can be advantageously used when the film is to be attached to the surface of a molded article with a complex shape obtained by insert molding.

DETAILED DESCRIPTION OF PREFERRED EMBODIMENTS OF THE INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

The decorative film of the present invention has a construction including a transparent layer or support and a decorative metal layer on the surface of the adhered side of the support. The support of the film is characterized by consisting of a terpolymer of tetrafluoroethylene (hereinafter referred to as TFE), hexafluoropropylene (HFP) and vinylidene fluoride (VDF). The weight ratio ranges of the monomers of this copolymer, tetrafluoroethylene, hexafluoropropylene and vinylidene fluoride are preferably about 35–65:15–25:15–45. The weight range 35–65 is for tetrafluoroethylene, 15–25 is for hexafluoropropylene, and 35–45 is for vinylidene fluoride. It is more preferable for the weight ratio ranges to be about 35–45:15–25:35–45. It has been found that when the weight ratios of the monomers are outside of these ranges, a sufficient value cannot be obtained for at least one of the many desired properties.

In most cases, the transparent layer or layers may consist only of the terpolymer TFE/HFP/VDF, requiring no addition of another synthetic resin. However, another resin may be added if necessary if its addition brings out a different effect in addition to the desired effect. Also, an additive which is commonly used in the field of polymer or copolymer film production, such as an ultraviolet absorber, may be added to the terpolymer if necessary. The TFE/HFP/VDF terpolymer may be acquired, for example, in the form of THV200P (trade name) fluororesin (TFE:HFP:VDF=40:20:40) from Dyneon Co.

The support made of the TFE/HFP/VDF terpolymer must have sufficient transparency to allow at least the underlying decorative metal layer to be observed through it. The transparency is usually sufficient if the decorative metal layer is clearly recognizable by visual observation. To specify the transparency in numerical terms, the haze value is preferably a value no greater than 1.0%. The haze value is the value as determined according to JIS K7105.

The thickness of the support is not particularly restricted. It may be varied depending on the purpose of use of the desired decorative film. However, the thickness of the support is usually preferred to be about 10–100 μm. If it is too thin, stripping of the film can result. If it is too thick, the effect of the invention cannot be exhibited, including especially emulation of three-dimensional curvature.

The decorative metal layer, to be supported by the transparent layer consisting of the TFE/HFP/VDF terpolymer, may have any of a variety of forms. The metal layer may be, for example, a metal foil or film, metal plating or a metal vapor deposition layer, and it preferably is made of a metal vapor deposition film from the stand point of manageability and excellence of appearance. The metal vapor deposition film may be formed using a common vacuum vapor deposition process. The vapor coated metal may be varied as desired for the intended decorative effect, and metals generally used include chromium, aluminum and tin. The thickness of the decorative metal layer may be varied within a wide range depending on the type of metal layer, but for a metal vapor coating layer the thickness is generally about 100–2000 Å.

The decorative film of the invention preferably has an additional adhesive layer on the metal layer. The presence of the adhesive layer allows easier and more reliable attachment of the decorative film to a substrate or other structure and connection between the decorative film and molded articles for in-molding. That is, in the former case, firm attachment of the decorative film to the adhered surface is ensured through the adhesive layer; while in the latter case, attachment of the decorative film to the adhered surface may be accomplished by firmly attaching the surface of the support of the decorative film with no metal layer to a prescribed location of the inner wall of the molding frame by in-molding, and molding the molding material for formation of the substrate while maintaining firm attachment of the support to the inner wall. In other words, in the latter case the decorative film is attached to the surface of the molded product when the molding material is hardened into a molded article or product. The adhesive layer may be formed by applying and drying a selected adhesive onto the decorative metal layer, or by attaching an industrially available adhesive film or tape, such as an adhesive film with a peelable backing, onto the decorative metal layer.

The decorative film of the invention may be produced using any of a variety of processes, and there are no particular restrictions on the technique. The present inventors have found that the following procedure is particularly advantageous for producing the decorative film, in order to more than adequately exhibit the properties of the support material of the decorative film consisting of the TFE/HFP/VDF terpolymer and the metal layer.

(1) Formation of TFE/HFP/VDF Terpolymer Film

An application solution of the TFE/HFP/VDF terpolymer is cast into a carrier film of the desired thickness and dried. An organic solvent is used to prepare the application solution. Suitable organic solvents include, for example, ketone-based organic solvents such as methyl ethyl ketone (MEK), ester-based organic solvents and ether-based organic solvents. Essential here is that the application solution obtained by dissolving the terpolymer in the organic solvent have a higher solid content than application solutions of fluorine-containing resins which have been used to prepare conventional decorative films. The solid content of the application solution is generally about 10–40 wt %.

A sheet-like substrate used as the carrier film may be a material commonly used for casting processes, and preferably the sheet-like substrate used has undergone release treatment on at least the side on which the terpolymer application solution has been applied. Suitable sheet-like substrates include, for example, biaxially oriented polyester (PET) films which have undergone release treatment on one side, such as the non-silicone-based release film Purex™#11 by Teijin Co.

The casting process may be carried out by any generally known technique. After application of the application solution, it is usually dried by hot-air drying. As a result, the organic solvent in the application solution is blown away to obtain a terpolymer film of the desired hardness. Usually the film is then sent to the metal layer-forming step while attached to the sheet-like substrate. However, if necessary the terpolymer film may be used after being separated from the sheet-like substrate. The resulting terpolymer film is colorless and transparent, with a uniform thickness, lacking appearance defects such as fish eyes and flow marks, and has an elongation represented by a breaking ductility of close to 500% at normal temperature.

(2) Formation of Decorative Metal Layer

As already explained above, the decorative metal layer may be formed into different shapes using various different techniques. Formation of the preferred metal vapor deposition film will now be explained.

The vapor deposition apparatus used may be a commercially available vacuum vapor deposition apparatus, such as the EX-400 vacuum vapor deposition apparatus produced by Nihon Vacuum Technologies. The terpolymer film prepared earlier is loaded into the vacuum vapor deposition apparatus and a metal such as chromium is deposited by electron beam vapor deposition. The vapor coating conditions applied are those generally employed for metal vapor coating, and will depend on the desired results. This gives a decorative film with a thin decorative metal layer evenly coated on the surface of the terpolymer film.

(3) Formation of Adhesive Layer

An adhesive layer is preferably formed over the decorative metal layer of the decorative film produced in the manner described above. The adhesive layer may be formed by many different techniques as mentioned earlier, but the following explanation concerns formation of the adhesive layer using an adhesive film. For example, the adhesive film may be prepared by applying an adhesive solution to the release-treated side of a biaxially oriented polyester (PET) film which has undergone release treatment on one side, such as the non-silicone-based release film Purex #20 by Teijin Co., followed by drying. The adhesive side of the resulting adhesive film is then attached by adhesion and integrated with the metal layer of the decorative film produced by the aforementioned steps. The release film itself may be released and removed just prior to using the decorative film.

The decorative film of the invention has an excellent metal luster appearance, as well as excellent three-dimensional curvature emulating and three-dimensional curvature forming properties, long-term weather resistance and stain resistance, thus allowing its use for decoration in a wide range of fields, for example as labels, stickers and stripe tape for vehicles such as automobiles and motorcycles, and for in-molding.

As a preferred embodiment in connection with in-molding, the decorative film is set in an in-molding injection molding frame with its adhesive layer surface facing the injection resin side, and a urethane resin is injected by low temperature low-pressure reaction injection molding. Satisfactory results have been obtained with an injection molding temperature of around room temperature. Though, it is believed that injection molding temperatures of up to about 120° C. can be used. In addition, the resin supply pressure can be in the range of from approximately 0.2 to 5 kilograms of force per square centimeter ($kgf/cm^2$). Though, the injection pressure of the resin into the mold is almost zero while the resin is being injected into the open face of the mold cavity. Next, after hardening the urethane resin, it is released. This gives a urethane resin molded product with a metal luster appearance on the surface. Other resins, besides a urethane, can be injection molded with the present decorative film, depending the resin's compatibility with the adhesive used for the adhesive layer or its compatibility with the metal layer, if no adhesive layer is used. The molded product obtained in this manner has a metal luster-provided fluorine resin film which satisfactorily emulates intricate shapes of molding frames, and gives a good metallic appearance to the molded products. In addition, since a fluorine-containing resin with excellent properties is used as the uppermost layer, the resulting molded product also exhibits satisfactory long-term weather resistance and stain resistance. Here, injection molding was used as the example of in-molding, but blow molding, cast molding, etc., may also be employed as necessary.

EXAMPLES

The present invention will now be explained in more detail by way of the following examples. It is, however, to be understood that the present invention is in no way limited by these examples.

Example 1
Formation of Transparent Layer

A THV200P (trade name) fluororesin (product of Dyneon Co.: TFE:HFP:VDF=40:20:40, weight average molecular weight (styrene conversion) =$1.7\times10^5$) was dissolved in methyl ethyl ketone, to prepare a fluororesin solution with a solid content of 30 weight percent. This resin solution was then applied to the release-treated side of a one-side release-treated PET film (Purex™ release film #11, product of Teijin Co.) and dried with hot air. The methyl ethyl ketone was evaporated from the coating to obtain a 25 µm-thick fluororesin film. The resulting film was colorless and transparent, with no fish eyes or other appearance defects.
Formation of Decorative Metal Layer The fluororesin film prepared by the step described above was set in an EX-400 (trade name) vacuum vapor deposition apparatus, product of Nihon Vacuum Technologies, and chromium was deposited by electron beam vapor deposition. An approximately 500 Å-thick metal chromium layer was coated onto the fluororesin film, giving a metallic appearance film as a decorative film according to the invention.
Formation of Adhesive Layer A polyamide resin (Macromelt™ 6239, product of Henkel Japan Co.) was dissolved in an isopropyl alcohol/toluene mixed solution (1:1) to prepare a polyamide resin solution with a solid content of 30 weight percent. The resulting resin solution was then applied onto the silicone-treated side of a one-side silicone-treated PET film (Purex™ release film #20, product of Teijin Co.) and dried with hot air. The solvent was evaporated from the coating to obtain a 15 µm-thick polyamide-based adhesive film. The adhesive side of this film was pasted against the metal chromium side of the metallic appearance film prepared in the previous step to make a metallic appearance film with an adhesive layer.
In-Molding The Purex™ release films #11 and #20, covering the support side (i.e., transparent layer) and adhesive layer -provided metallic appearance film made in the previous step, were peeled off. The metal appearance film was then set in an in molding injection molding frame with the adhesive layer surface of the film facing the injection resin. After the film was completely set, a urethane resin prepared by mixing polyester polyol (D6990 by 3M Co.) and polyisocyanate (Sumidule™ by Sumitomo Bayer Urethane Co.) at 1:1.1 (weight ratio) was injected by low-temperature low-pressure reaction injection molding. The injected resin temperature was in the range of from about 18° C. to about 25° C., with the mold temperature at approximately 40° C. The resin supply pressure was in the range of from approximately 0.2 $kgf/cm^2$ to 5 $kgf/cm^2$. The injection pressure of the resin into the mold was almost zero while the resin was injected into the open face of the mold cavity. After hardening of the urethane resin, the molded product was released. This gave a urethane resin molded product with a metal luster appearance on the surface. The resulting molded product not only had excellent transparency, but the metal luster-provided fluororesin film satisfactorily emulated the intricate structure of the frame and had a good metallic appearance. In addition, the molded product also had excellent long-term weather resistance and stain resistance.

Comparative Example 1

The procedure described in Example 1 was repeated. In this example, however, the prepared support was a layered film (product of Denki Kagaku Industries Co.) consisting of a polyvinylidene fluoride/polymethyl methacrylate mixed resin extrusion molded film and a PET film, for comparison. The fluororesin film side of the support was vacuum vapor coated with chromium metal as in Example 1. This formed an approximately 500 Å-thick metal chromium later on the fluororesin film. Although this comparative metallic appearance film had a colorless and transparent fluororesin film, because it was formed by extrusion molding, appearance defects such as fish eyes were found.

Next, the adhesive side of a polyamide-based adhesive film was pasted onto the metal chromium side of the metallic appearance film as in Example 1. This gave an adhesive layer-provided metallic appearance film.

This adhesive layer-provided metallic appearance film was then used for in-molding in the same manner as Example 1. The resulting molded product had a metal luster appearance, but the fluororesin film failed to emulate the intricate structure of the frame, and therefore the molded product did not have the desired design form. In addition, appearance defects such as fisheyes were also found in this molded product, generated in the fluororesin film.
Comparative Example 2

The procedure described in Example 1 was repeated. In this example, however, the fluororesin Neoflon™ VT-100 (trade name) (product of Daikin Industries Co.) was dissolved in acetone to prepare a fluororesin solution with a solid content of 20 weight percent, for comparison. This resin solution was then applied onto the release-treated side of a one-side release-treated PET film (Purex™ release film #11, product of Teijin Co.) and dried with hot air. The acetone was evaporated from the coating to obtain a 20 µm-thick fluororesin film. However, the resulting film had notable hazing and was not suitable for the subsequent metal chromium vapor coating step.

As explained above, according to the present invention there is provided a decorative film which can be used for decoration as a label, sticker, stripe tape, etc. or which can alternatively be used for in-molding. The decorative film of the present invention, while naturally exhibiting an excellent decorative effect with a metal luster appearance, can also be attached to the surface of substrates having a complex three-dimensional curvature, and particularly in-molded products, without creating defects which result in a poor appearance, etc. The present decorative film also has excellent long-term weather resistance and stain resistance.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof

What is claimed is:

1. A decorative film comprising:

a transparent layer having an adhered side for being adhered to a substrate, said transparent layer comprising a copolymer of tetrafluoroethylene, a hexafluoropropylene and a vinylidene fluoride, wherein the weight ratio ranges of the tetrafluoroethylene, hexafluoropropylene and vinylidene fluoride in said copolymer is about 35–65:15–25:15–45;

a decorative metal layer on the adhered side of said transparent layer.

2. The decorative film according to claim 1, wherein said transparent layer consists essentially of said copolymer.

3. The decorative film according to claim 1, wherein said transparent layer consists of said copolymer.

4. The decorative film according to claim 1, wherein said metal layer is a metal vapor deposition film.

5. The decorative film according to claim 1, further comprising an adhesive on said metal layer.

6. A decorative article comprising:

a transparent layer having an adhered side and comprising a copolymer of a tetrafluoroethylene, a hexafluoropropylene and a vinylidene fluoride, wherein the weight ratio ranges of the tetrafluoroethylene, hexafluoropropylene and vinylidene fluoride in said copolymer is about 35–65:15–25:15–45;

a decorative metal layer on the adhered side of said transparent layer; and a substrate bonded to said metal layer.

7. The decorative article according to claim 6, wherein said substrate is a complex three dimensional shaped substrate.

8. The decorative article according to claim 6, wherein said substrate is an injection molded substrate.

9. The decorative article according to claim 7, wherein the weight ratio ranges of the tetrafluoroethylene, hexafluoropropylene and vinylidene fluoride in said copolymer is about 35–45:15–25:35–45.

10. The decorative article according to claim 6, wherein said metal layer is a metal vapor deposition film.

11. The decorative article according to claim 6, further comprising an adhesive layer between said metal layer and said substrate.

12. A method of making a decorative substrate comprising the steps of:

casting a transparent layer comprising a copolymer of a tetrafluoroethylene, a hexafluoropropylene and a vinylidene fluoride, wherein the weight ratio ranges of the tetrafluoroethylene, hexafluoropropylene and vinylidene fluoride in said copolymer is about 35–65:15–25:15–45;

applying a decorative metal layer on the adhered side of the transparent layer to form a decorative film; and attaching the metal layer of the decorative film to a substrate so as to form a decorative substrate.

13. The method according to claim 12, wherein the substrate is a complex three dimensional shaped substrate and the decorative film is attached so as to conform to the shape of the substrate.

14. The method according to claim 12, wherein said method includes the step of injection molding the substrate.

15. The method according to claim 12, wherein said step of attaching the decorative film includes the step of insert molding the substrate to the decorative film.

16. The method according to claim 15, wherein said step of insert molding is at an injection resin temperature in the range of from about 18° C. to about 25° C. and a resin supply pressure in the range of from approximately 0.2 kgf/cm$^2$ to 5 kgf/cm$^2$.

17. The method according to claim 12, further comprising the step of applying an adhesive on the decorative metal layer so as to be between the metal layer and the substrate in the decorative substrate.

18. The method according to claim 12, wherein said step of applying the decorative metal layer comprises the vapor deposition of the metal layer on the adhered side of the transparent layer to form the decorative film.

* * * * *